United States Patent [19]

Hoffrichter et al.

[11] Patent Number: 4,631,579

[45] Date of Patent: Dec. 23, 1986

[54] METHOD AND APPARATUS FOR THE PRODUCTION OF COLOR SEPARATIONS FOR SINGLE COLOR PRINTING

[75] Inventors: Ingo Hoffrichter, Kiel; Eggert Jüng, Schoenberg, both of Fed. Rep. of Germany

[73] Assignee: Dr. Ing. Rudolf Hell GmbH, Fed. Rep. of Germany

[21] Appl. No.: 680,820

[22] Filed: Dec. 12, 1984

[30] Foreign Application Priority Data

Dec. 14, 1983 [EP] European Pat. Off. ........ 83112578.6

[51] Int. Cl.$^4$ .......................... G03F 3/08; H04N 1/46
[52] U.S. Cl. ......................................... 358/80; 358/75
[58] Field of Search ............................. 358/80, 75, 79

[56] References Cited

U.S. PATENT DOCUMENTS

| | | | |
|---|---|---|---|
| 4,110,826 | 8/1978 | Möllgaard et al. | 358/75 |
| 4,194,839 | 3/1980 | Knop | 356/407 |
| 4,261,011 | 4/1981 | Knop | 358/75 |
| 4,403,249 | 9/1983 | Knop et al. | 358/80 |

*Primary Examiner*—Michael A. Masinick
*Assistant Examiner*—Robert Bauer

*Attorney, Agent, or Firm*—Hill, Van Santen, Steadman & Simpson

[57] ABSTRACT

In electronic reproduction technology, a method and an apparatus for the production of hue and color separations for single color printing. A color original is opto-electronically scanned to obtain measured color value signals. A recognition region for a selected separation hue is defined in a recognition circuit. A hue recognition signal, which is a measure for the hue deviations of the hues scanned in the color original from the selected separation hue, is generated from the measured color value signals. Corrected color signals are derived from the measured color value signals and at least one corrected color signal is selected for further processing. A recording signal is acquired in a mixer stage by mixing the selected color signal and the hue recognition signal. The recording signal controls a recording element for recording of the hue separation. When color separations are to be produced, a recognition region for a selected separation color is defined and a color recognition signal is generated and mixed with the selected color signal to obtain the recording signal which controls the recording of the color separation.

31 Claims, 13 Drawing Figures

METHOD AND APPARATUS FOR THE PRODUCTION OF COLOR SEPARATIONS FOR SINGLE COLOR PRINTING

BACKGROUND OF THE INVENTION

The invention relates to the field of electronic reproduction technology for single color printing and is concerned with a method and an apparatus for the production of color separations for single color printing. What is meant by single color printing is, for example, textile, decorative, or packaging printing.

Whereas the inking of the print medium in polychromatic mixed or multicolor printing occurs by superimposed printing of different proportions of the inks "yellow", "magenta", "cyan", and "black", each color to be printed in single color printing is blended before the printing process and is then separately applied to the print medium, so that a corresponding color separation must be produced for every color of a color original.

Such a color original comprises, for example, hues having a progressive color distribution, i.e. having a different color saturation and/or luminance within the individual hues. In this case, the color separations must supply information regarding the topical distribution of the individual colors as well as information regarding the color progression, i.e. regarding the topically different intensity of the ink application.

An apparatus for the production of color separations for single color printing is already known from German Letters Pat. No. 26 28 053, corresponding to U.S. Letters Pat. No. 4,194,839, incorporated herein by reference. Three primary measured color value signals are acquired by means of opto-electronically scanning a color original point-by-point and line-by-line, said measured color value signals representing the color components, red, green, and blue of the scanned image points. A color recognition circuit receiving the measured color value signals, and in which a color recognition region for a color to be separated (separation color) in the color original is defined with a color space, selects the selected separation color from the other colors of the color originals during the scanning of the original and always generates a color recognition signal when the selected separation color is recognized in the color original. The color recognition signal is forwarded as a color separation signal to a recording element, for example a write lamp, whose brightness is modulated as a function of the color separation signal. The write lamp exposes a film as a recording medium point-by-point and line-by-line, said film representing the color separation for the selected separation color after it has been developed.

The known apparatus has the disadvantage that essentially only prismatic color recognition spaces can be defined or delineated. The color recognition spaces can therefore not be optimally matched in terms of size and shape to the color regions prescribed by the color progressions of the separation colors, the color separation signal thus not supplying an unequivocal statement regarding the color saturation and/or luminance of the separation colors.

Another apparatus for the production of color separations for single color printing is disclosed in German Letters Pat. No. 28 53 511, corresponding to U.S. Pat. No. 4,261,011, incorporated herein by reference. Given this apparatus, corrected color separation signals are derived from the measured color value signals and one of the corrected color separation signals is selected for recording a color separation for the single color printing. A color recognition signal which supplies a yes/no statement regarding the presence of the selected separation color in the color original is generated with the assistance of a color recognition circuit in which a color recognition space for the separation color is again defined. During recording of the color separation, the color recognition signal always connects through the selected, corrected color separation signal to the write lamp when the pre-set separation color is recognized in the color original. As a consequence of the switching, the color distributions in the color separations always appear sharply delineated, so that the individual separation colors are printed exactly side-by-side in the printing occurring later. This can occasionally lead to disturbing contours of color progressions in the print.

A modification of the above-described apparatus is known from European patent application No. 82112002.9, incorporated herein by reference, wherein the formation of such contours is in fact reduced, but a progressive color separation signal which exactly reproduces a color progression is nonetheless not generated therein.

All known apparatus also have the disadvantage that they are not specifically designed for the extraction of hues.

SUMMARY OF THE INVENTION

It is an object of the invention to specify a method and an apparatus for the production of color separations for single color printing by which separation hues as well as separation colors can be optimally defined with respect to hue, color saturation, and luminance, and with which color separation signals which exactly reproduce color progressions are generated.

When recording color separations, the specified invention also allows an exact separation of the selected hues from their complementary hues or from hues in the gray region.

Since the physiological color sensation of man and the demarcation or definition of the recognition spaces given the specified invention are executed in terms of hue, color saturation, and luminance, the invention also has the advantage that the demarcation or definition of recognition spaces is checkable by the operator.

According to the invention for production of color separations of a color original for single color printing, the color original is trichromatically scanned point-by-point and line-by-line by an opto-electronic scanning element for acquisition of measured color value signals R, G, B. Corrected color signals F are generated from the measured color value signals R, G, B. A color locus $F_0$ of a selected separation hue $T_0$ of a color of the original is determined by color values $R_0$, $G_0$, $B_0$. The color locus $F_0$ of a separation hue $T_0$ is transformed into the chrominance plane of a chrominance/luminance color space by a first transformation of the color values $R_0$, $G_0$, $B_0$ into corresponding chrominance values $x'_0$, $y'_0$ such that the transformed color locus $F'_0$ lies on one of the axes of a rotated $X'Y'$ color coordinate system in the chrominance plane of the color space. The transformation coefficients required therefor are retained. The color loci of hues of the scanned colors of the original are continuously transformed into the chrominance plane by a second transformation of the measured color value signals R, G, B into chrominance values $x'$, $y'$ with the previously identified transformation coefficients. Those chrominace values x', y' are selected whose corresponding transformed color loci F' lie in a same half of the x'y' rotated color coordinate system as the transformed color locus F'$_0$ of the separation hue T$_0$. A hue signal T' is acquired by forming a quotient of the absolute values of the selected chrominance values x', y', this respectively corresponding to a tangent of an angle $\beta$ which is described by the corresponding axis and a connecting line between coordinate origin and a transformed color locus F' of the hue of a scanned color of the original so that the hue signal T' is a measure for the respective value-wise hue deviation of the hue of the scanned color of the original from separation hue T$_0$. The hue recognition signal E' is acquired from a substantially constant auxiliary control signal H and the hue signal T'. The hue recognition signal E' has its highest value when scanning the separation hue and having a value of zero when scanning a hue having a prescribed, maximum hue deviation from the separation hue T$_0$. A sector-shaped hue recognition region is defined around the corresponding axis and around the separation hue T$_0$. The hue recognition signal E' is emitted when the measured color value signals R, G, B fall within the recognition region. A color separation is recorded point-by-point and line-by-line on a recording medium by a recording element controlled by a separation signal A by combining the hue recognition signal E' for the selected separation hue T$_0$ with the corrected color signal F to form the separation signal A for recording of the color separation.

DESCRIPTION OF THE PREFERRED EMBODIMENTS

Figure 1:
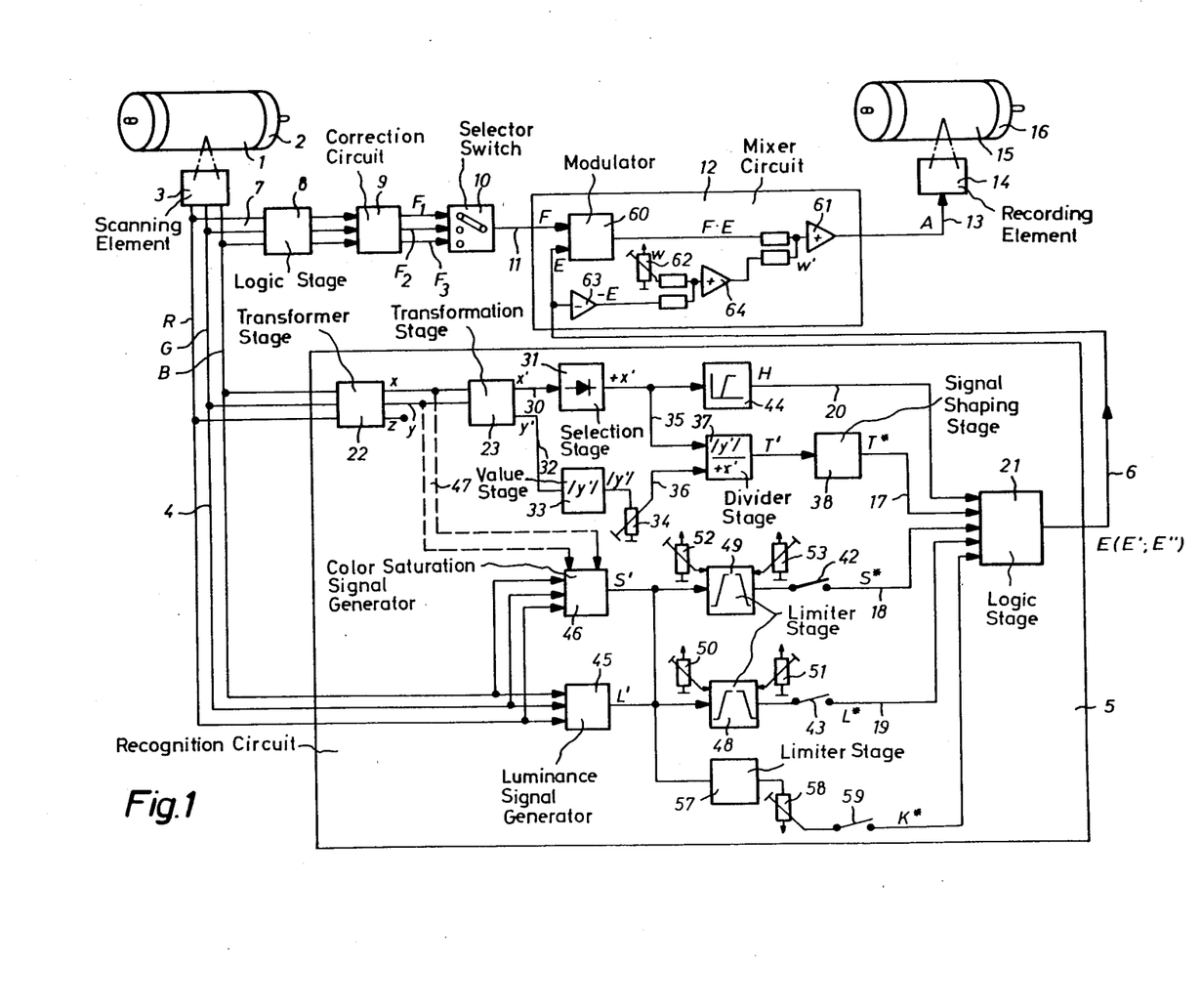
FIG. 1 is an illustrative embodiment of an apparatus for the production of color separations.

FIG. 1 shows an illustrative embodiment of an apparatus for the production of color separations for single color printing which is referred to below as a color scanner for single color printing.

As already presented in the introduction to the specification, every individual color to be printed is blended before the printing process given single color printing, as opposed to polychromatic mixed printing, and the various individual colors are applied to the print medium in separate operations. Given single color printing, therefore, a corresponding color separation must be produced for every individual hue to be separated, or for every individual color to be separated in the color original to be reproduced. Accordingly, the concern is that the color progressions of the color original be reproduced as well as possible in the color separations.

Figure 8:
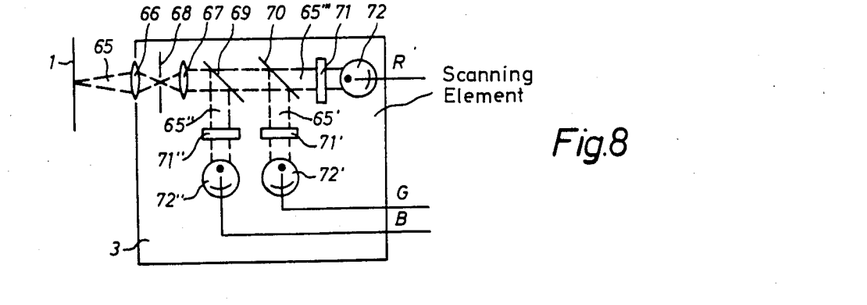
FIG. 8 is an illustrative embodiment of an opto-electronic scanning element.

The color original from which the corresponding color separations are to be produced for the single color printing is situated on a rotating scanner drum 2 of a color scanner (not shown in greater detail), and is trichromatically scanned point-by-point and line-by-line by an opto-electronic scanning element 3. The scan light reflected or transmitted by the scanned color original 1 is converted into the measured color value signals R, G, and B in the opto-electronic scanning element 3 with the assistance of color splitters, corrective filters, and opto-electronic transducers. The measured color value signals R, G, and B are a measure for the intensities of the primary color components "red", "green" and "blue" at the scanned colors. The measured color value signals R, G, and B represent the spatial or color coordinates of the color loci of the scanned colors in the cartesian RGB color space. The opto-electronic scanning element 3 which is axially displaceable relative to the scanner drum 2 is employed both for measuring individual color points in the color original 1 as well as for the area-wise point-by-point and line-by-line scanning of the color original 1 during the actual recording of the color separations. FIG. 8 shows an illustrative embodiment of an opto-electronic scanning element. The measured color value signals R, G, and B proceed via lines 4 to a recognition circuit 5 which, as shall be explained in greater detail later, is respectively pre-set to that individual hue or that individual color of the color original 1 referred to below as separation hue or separation color from which a color separation is to be recorded at the moment. The recognition circuit 5 outputs a corresponding recognition signal E on a line 6.

The measured color value signals R, G, and B acquired in the opto-electronic scanning element 3 are simultaneously forwarded via line 7 to a logarithmizing stage 8 in which they are logarithmized or partially logarithmized into measured color value signals R', G', and B'. The logarithmizing stage 8 is followed by a correction circuit 9 for color and/or gradation correction. This correction circuit 9 can, for example, be a color computer for polychromatic mixed printing. The correction circuit 9 generates color signals F$_1$, F$_2$, and F$_3$ which, depending upon the setting of the correction regulator in the correction circuit 9, can correspond to the color separation signals Y, M, and C for the polychromatic mixed printing, to the uncorrected measured color value signals R', G', and B' or, on the other hand, to intermediate values as well.

The color signals F$_1$, F$_2$, and F$_3$ are supplied to a selection switch 10 with which an operator selects the color signal F which is best suited based on his experience and the job being processed for the recording of the corresponding color separation, for example which best reproduces the color progression of the separation hue or of the separation color.

Formed from the selected color signal F on a line 11 and from the recognition signal E on the line 6 is an individual color separation signal A in a mixer circuit 12. This signal A is forwarded via a line 13 to a recording element 14 in the form of a write lamp. The write lamp, whose brightness is modulated by the individual color separation signal A, exposes a recording medium, for example a film 15, point-by-point and line-by-line, said recording medium 15 being clamped to a rotating recording drum 16 of the color scanner. The exposed and developed film is the desired color separation.

A hue control signal T* on a line 17, a color saturation signal S* on a line 18, a luminance control signal L* on a line 19, as well as an auxiliary control signal H on a line 20 are generated in the recognition circuit 5 from the supplied measured color value signals R, G, and B. Hue control signal T*, color saturation signal S*, luminance control signal L*, as well as the auxiliary control signal H are combined with one another in a logic stage 21 to form the recognition signal E on the line 6.

When a separation hue is to be set in the recognition circuit 5, a sector-shaped hue recognition region is defined in the chrominance plane around a separation hue $T_0$ that is freely selectable in all four quadrants. In this case, the recognition signal E on the line 6 is a hue recognition signal E' which is acquired in the logic stage 21 from the hue control signal T* and the auxiliary control signal H. Given the point-by-point and line-by-line scanning of the color original 1 during the actual recording of the color separation, the hue recognition signal E' supplies information regarding the distance of the hues of the scanned colors from the established separation hue $T_0$ in case the hues of the scanned colors lie within the defined hue recognition region; otherwise, the hue recognition signal E' is equal to zero.

When the recognition circuit 5 is to be set to a separation color, a sector-shaped hue recognition region is additionally defined with respect to the luminance and the color saturation, so that a three-dimensional color recognition region arises around the separation hue $T_0$. In this case, the recognition signal E is a color recognition signal E" which is formed by means of an additional combination of the hue control signal T* and of the auxiliary control signal H or of the hue recognition signal E' with the color saturation control signal S* and/or luminance control signal L* in the logic stage 21.

The structure and function of the recognition circuit 5 shall be explained in greater detail below, first for that case in which the recognition circuit 5 is to be set to a separation hue.

The measured color value signals R, G, and B supplied from the opto-electronic scanning element 3 via the line 4 are logarithmized or partially logarithmized into measured color value signals R', G', and B' in a transformer stage 22, and are corrected according to a gradation curve under given conditions and are transformed into chrominance signals x and y and into a luminance signal z by means of a matrixing according to equations (2):

$$x = a_{11}R' + a_{12}G' + a_{13}B'$$

$$y = a_{21}R' + a_{22}G' + a_{23}B'$$

$$z = a_{31}R' + a_{32}G' + a_{33}B' \quad (2)$$

The matrixing corresponds to a transformation of the color coordinates of the cartesian RGB color space into the color coordinates x, y, and z of the chrominance/luminance color space, whereby the color coordinates x and y identify the position of the color loci of the colors in the chrominance plane, and the color coordinates z identify the luminance values of the colors. Hue (T), color saturation (S), and luminance (L) are the cylindrical color coordinates of the hue/color saturation/luminance color space, whereby the position of the color loci in the chrominance plane thereof are determined by the hue values T as the angle and by the color saturation values S as the radii, whereas the luminance values of the colors are defined by the luminance L. The following relationships therefore exist between the color coordinates x, y, and z of the chrominance/luminance color space and the color coordinates hue T, color saturation S, and luminance L of the hue/saturation/luminance color space:

$$T = c_1 \arctan \frac{y}{x} \quad (1)$$

$$S = c_2 \sqrt{x^2 + y^2}$$

$$L = c_3 z$$

First, the desired separation hue $T_0$ around which a hue recognition region is to be delimited is defined by means of prescribing a measured color value triad $R_0$, $G_0$, and $B_0$, or by its chrominance values $x_0$ and $y_0$ formed by matrixing or by measuring a sample point in the color original 1 with the assistance of the opto-electronic scanning element 3.

The chrominance values $x_0$ and $y_0$ are inventively transformed into corresponding chrominance values $x'_0$ and $y'_0$ by a matrixing according to equations (3) settable to the selected separation hue $T_0$, whereby the transformation coefficients a, b, c, and d are defined such that the conditions $x'_0 > 0$ and $y'_0 = 0$ are met.

$$x'_0 = bx_0 + cy_0$$

$$y'_0 = -dx_0 + ey_0 \quad (3)$$

Transformation coefficients having the form $b = e = -\cos \alpha$ and $c = -d = \sin \alpha$ are preferably employed in the selected illustrative embodiment, so that the matrixing corresponds to a rotation of an X'Y' color coordinate system by an angle relative to the original XY color coordinate system according to equation (4).

$$x'_0 = x_0 \cos \alpha + y_0 \sin \alpha$$

$$y'_0 = -x_0 \sin \alpha + y_0 \cos \alpha \quad (4)$$

The angle $\alpha_0$ required to meet the conditions $x'_0 > 0$ and $y'_0 = 0$ is defined in a transformation stage 23 by means of an automatic balancing operation given continuous checking of the conditions $x'_0 > 0$ and $y'_0 = 0$ in a monitoring stage within the transformation stage 23 since the angle is modified until the monitoring stage determines that the conditions have been met. The determined angle $\alpha_0 = \arctan y_0/x_0$ corresponds to the separation hue $T_0$ and the X' axis of the X'Y' color coordinate system rotated by the angle $\alpha_0$ proceeds through the color locus $F'_0$ of the separation hue $T_0$ which has been transformed into the chrominance plane. The described coordinate rotation corresponds to a rotation of the chrominance/luminance color space around the luminance axis (Z).

The determined angle $\alpha_0$ is stored in the transformation stage 23 and is employed in the actual hue or color recognition during the recording of the color separation for the continuous transformation of the chrominance signals x and y into the rotated chrominance signals x' and y' according to equations (5), whereby the rotated chrominance signal y' differs from zero for all hues of the scanned colors which deviate from the selected separation hue $T_0$ and is equal to zero for all hues that coincide with the selected separation hue $T_0$:

$$x' = x \cos \alpha_0 + y \sin \alpha_0$$
$$y' = -x \sin \alpha_0 + y \cos \alpha_0 \quad (5)$$

It is within the framework of the invention to execute the matrixing according to equations (2), (4), and (5) in a single step.

Figure 9:
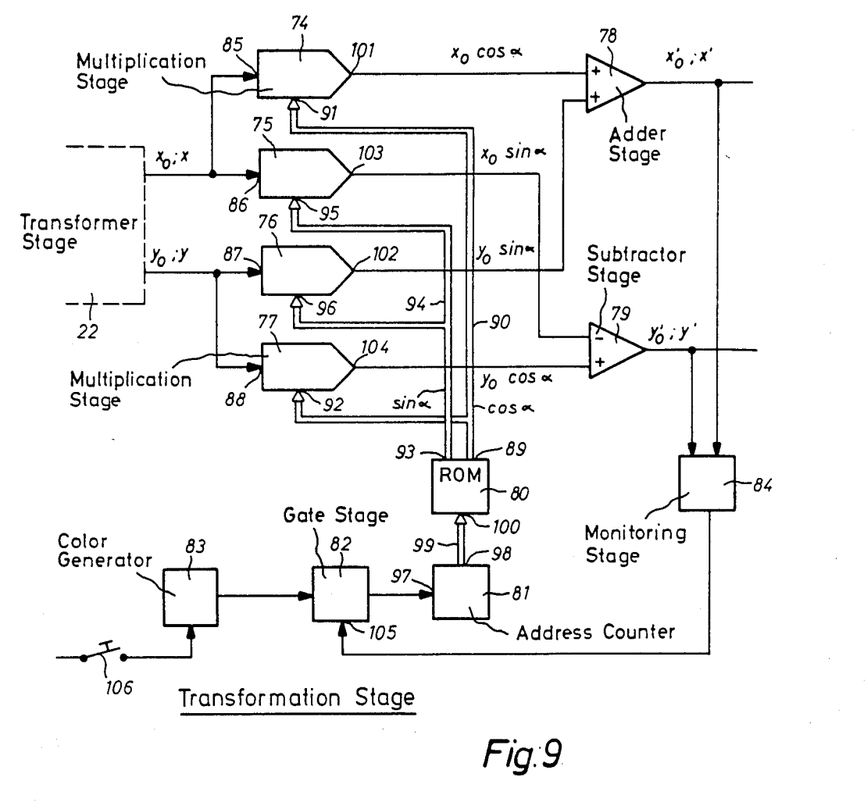
FIG. 9 is an illustrative embodiment of a transformation stage.

A more detailed illustrative embodiment of the transformation stage 23 is specified in FIG. 9.

Figure 2:
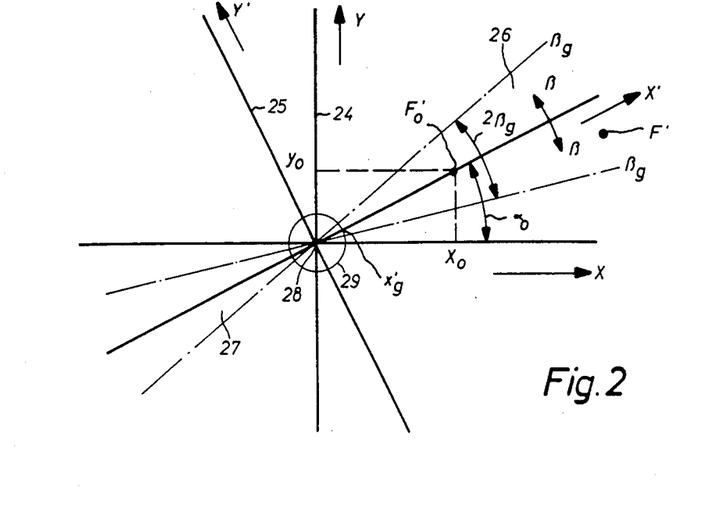
FIG. 2 is a graphic presentation showing coordinate rotation.

The above-described coordinate rotation shall be illustrated again with reference to a graphic presentation in FIG. 2.

FIG. 2 shows the chrominance plane of the chrominance/luminance color space having the XY color coordinate system 24, whereby the Z axis (gray axis) of the chrominance/luminance color space proceeds perpendicular to the chrominance plane. A transformed color locus $F'_0$ of a selected separation hue $T_0$ is defined in the XY color coordinate system 24 by the color coordinates $x_0$ and $y_0$. The X'Y' color coordinate system 25 rotated by the angle $\alpha_0$ is shown at the same time, the X' axis thereof proceeding through the transformed color locus $F'_0$ so that the transformed color locus $F'_0$ in the rotated X'Y' color coordinate system 25 has the color coordinates $x'_0 > 0$ and $y'_0 = 0$.

The angle $\alpha_0 = \arctan y_0/x_0$ corresponds to the separation hue $T_0$ in the XY coordinate system 24. A sector-shaped hue recognition region 26 symmetrical fo the X' axis of the rotated X'Y' color coordinate system 25 is shown at the same time, the critical angle $\beta_g$ (aperture angle $2\beta_g$) thereof being adjustable relative to the X' axis for the demarcation or definition of the separation hues. The rotated chrominance signal x' for an arbitrary color locus F' within the hue recognition region 26 corresponds to the color saturation in a first approximation given a small angle $\beta$, and the quotient $y'/x' = \tan \beta$ corresponds to the deviation of the hues of the scanned colors from the selected separation hue $T_0$, whereby the quotient increases with increasing deviation.

FIG. 2 also shows the complementary hues within a sector 27 which belong to the demarcated or defined separation hues, the sector 27 arising by mirroring the hue recognition region 26 at the Y' axis of the X'Y' color coordinate system 25. The rotated chrominance signal x' is positive for the defined separation hues but is negative for the complementary hues. It often proves necessary in the production of color separations to define a cylindrical or barrel-shaped color recognition space for "gray" around the gray axis 28, so that color fluctuations or progressions in the gray are recognized and recorded as uniform gray. The circular plane of section 29 of such a color recognition space for "gray" is also shown in FIG. 2, the radius thereof being defined by a boundary color saturation value $x'_g$.

Now referring again to FIG. 1, the rotated chrominance signal x' generated in the transformation stage 23 is supplied via a line 30 to a selection stage 31 in the form of a diode circuit that only transmits the positive values of the rotated chrominance signal x' as the signal +x'. A signal thus always appears at the output of the selection stage 31 only when the hues of the colors scanned from the color original 1 lie, relative to the Y' axis of the rotated X'Y' color coordinate system 25 (FIG. 2), on the side of the defined hue recognition region 26. Thus, complementary hues are not present in this instance, so that an exact separation of hues and complementary hues is achieved.

The rotated chrominance signal y' proceeds from the transformation stage 23 via a line 32 to a value stage 33. The absolute amount of the rotated chrominance signal y' is formed in the value stage 33 as signal /y'/.

The critical angle $\beta_g$ for the desired hue recognition region 26 (FIG. 2) is defined by means of setting the amplitude of the signal /y'/ by means of a potentiometer 34. The signals +x' and /y'/ are supplied via lines 35 and 36 to a divider stage 37 in which the hue signal T' is acquired by means of quotient formation according to equation (6):

$$T' = \frac{/y'/}{+x'} = \tan \beta. \quad (6)$$

The hue signal T' supplies an unequivocal statement about the value deviation of the hues of the colors scanned on the color original 1 from the established separation color $T_0$ in both directions, whereby T'=0 applies given hue coincidence.

As a result of the inventive coordinate rotation in the formation of the hue signal T', the standard difficulties in the formation of a hue identifying signal which derive due to the ambiguity of the tangent function and the asymmetry within a quadrant are advantageously avoided, and an exact hue separation is thus achieved.

In a signal shaping stage 38 connected following the divider stage 37, the hue signal T' is converted into the hue signal T* on the line 17.

Figure 3:
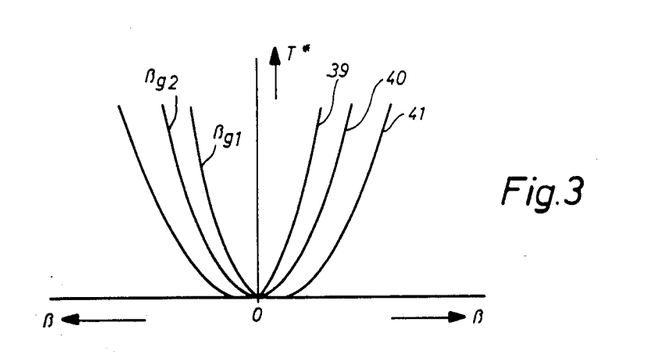
FIG. 3 is a graphic presentation of signal curves.

FIG. 3 shows various curves of the hue control signal T* as a function of the angle $\beta$. The curves 39 and 40 result for differently set critical angles $\beta_g$ of the hue recognition region for that case in which no signal influencing occurs in the signal shaping stage 38 and the hue control signal T* corresponds to the hue signal T'. The hue signal T' can still be modified in terms of amplitude and shape with the assistance of the signal shaping stage 38, so that, for example, the hue control signal T* is flattened in accordance with curve 41 in the region of small angles $\beta$.

The hue recognition signal E' on the line 6 is acquired from the hue control signal T* on the line 71 and the auxiliary control signal H on the line 20 in the logic stage 21 which is designed in the illustrative embodiment as a subtractor stage. This is acquired according to equation (7), whereby the two switches 42 and 43 are situated in the open, illustrated position.

$$E' = H - T^* \quad (7)$$

Alternatively, the combination of the auxiliary control signal H and hue control signal T* can also occur in multiplicative fashion.

Figure 10A:
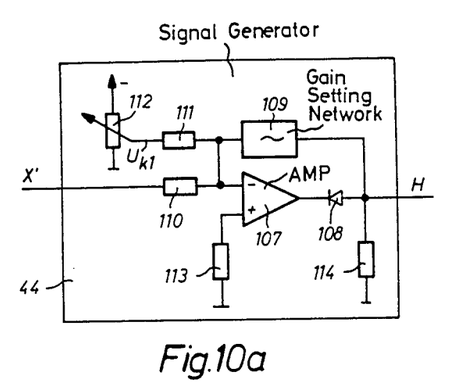
FIG. 10a is an illustrative embodiment of a signal generator.

The auxiliary control signal H, which is generated in a signal generator 44, has, for example, a constant value $H_0$ which is then preferably selected at $H_0 = \tan y_0/x_0$. It is more advantageous, however, as in the illustrative embodiment described, to make the auxiliary control signal H dependent on the color saturation, i.e. on the signal +x', to a first approximation. In this case, the auxiliary control signal H=f (x') has the constant value $H_0$ from the maximum color saturation value up to the proximity of the boundary color saturation value $x'_g$ already explained in FIG. 2, and then drops off and has the value zero between the boundary saturation value $x'_g$ and the gray axis (x'=0). FIG. 10 shows an illustrative embodiment of the signal generator 44.

Figure 4:
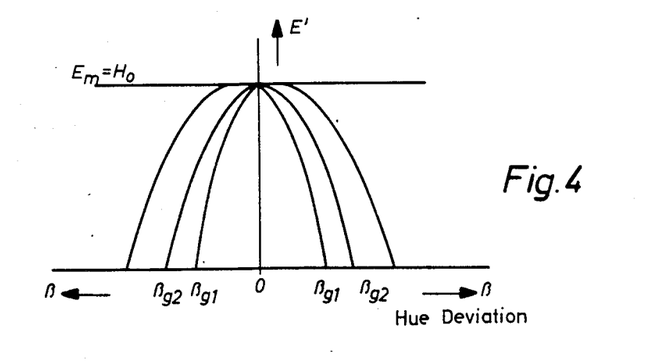
FIG. 4 is another graphic presentation of signal curves.

FIG. 4 shows various curves of the hue recognition signal E' dependent on the angle $\beta$ for various critical angles $\beta_g$ of the hue recognition region and for a constant auxiliary control signal $H_0$, or for that region of the auxiliary control signal H =f (x') lying between the boundary color saturation value and the maximum color saturation value.

The hue recognition signal E' has a maximum value $E_m=H_0$ for hues of the scanned colors which correspond ($\beta=0$) to the selected separation hue $T_0$, this maximum value exactly corresponding to the separation hue $T_0$ at $H_0=\tan y_0/x_0$. Given increasing deviation of the hues of the scanned colors from the separation hue $T_0$, the hue recognition signal E' decreases and reaches the value E'=0 at the respective critical angle $\beta$ of the established hue recognition region.

Alternatively to setting the critical angle $\beta_g$ of the hue recognition region with the assistance of a potentiomaeter 34, the critical angle $\beta_g$ can also be set by means of amplitude variation of the hue signal T' in the signal shaping stage 38, or to the value $H_o$ of the auxiliary control signal H in the signal generator 44.

Figure 5:
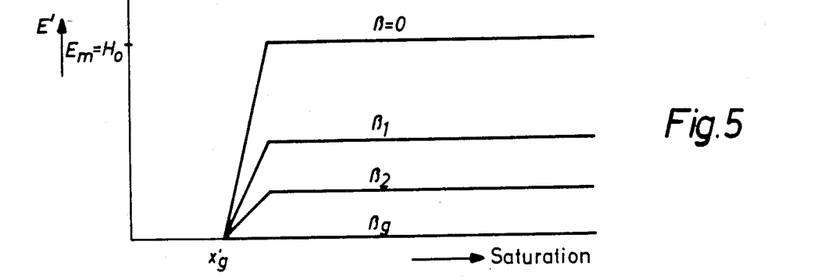
FIG. 5 is a further graphic presentation of signal curves.

FIG. 5 shows various curves of the hue recognition signal E' dependent on the signal x' or on the color saturation for that case in which the auxiliary control signal H=f (x') and the angle $\beta$ are parameters. A demarcation or definition toward "gray" is advantageously achieved due to the dependency of the hue recognition signal E' on the color saturation.

A dependency of the hue recognition signal E' on the color saturation can also be alternatively achieved in that the hue control signal T* is combined in multiplicative fashion with the signal +x' in the logic stage 21.

When the recognition circuit 5 is to be set to a separation color, then a three-dimensional color recognition region must be defined in the hue/color saturation/luminance color space since the sector-shaped hue recognition region is additionally defined with respect to the luminance and/or the color saturation.

For definition with respect to luminance, a luminance signal is acquired in the recognition circuit 5 in a luminance signal generator 45 to which the measured color value signal R, G, and B are supplied via the line 4. It is acquired therein from at least one, and preferably from all three measured color value signals R, G, and B according to the relationship $L'=f_1R+f_2G+f_3B$. The luminance signal z formed in the transformer stage 22 can also be employed as luminance signal L' in case all three measured color value signals R, G, and B participate in the formation of the luminance signal L'. The luminance signal generator can be omitted in this case.

For demarcation or definition with respect to color saturation, a color saturation signal generator 46 generates a color saturation signal S'. The color saturation signal S' can be acquired according to the equation $S'=\sqrt{x^2+y^2}$ from the chrominance signals x and y formed in the transformer stage 22, these being supplied to the color saturation signal generator 46 via the lines 47 shown with broken lines. In this case, the color saturation signal S' exactly reproduces the color saturation values of the scanned colors. Thus, the color saturation signal generator 46 contains corresponding arithmetic modules (squarers, adders, evolution units) which, however, do not permit a high working speed. In order to eliminate this difficulty, a color saturation signal S' approximated to the exact color saturation values is employed in an advantageous fashion, this approximated signal S' being derived in the color saturation signal generator 46 from the measured color values R, G, and B in that the maximum and the minimum measured color value signal is continuously determined therein and the differences of the extreme values are formed, these approximately corresponding to the color saturation signal S' since the maximum measured color value signal of a scanned color respectively represents the color saturation and the minimum measured color value signal represents the gray scale of this color. Since the color saturation signal generator 46 now no longer contains the arithmetic modules, the work speed of the circuit arrangement and thus the scan rate or the recording rate for the color separation can be advantageously increased by the specified signal formation. In case an even rougher approximation is permitted in the formation of the color saturation signal S', the signal +x' can also be used instead of the color saturation signal S'.

Figure 12:
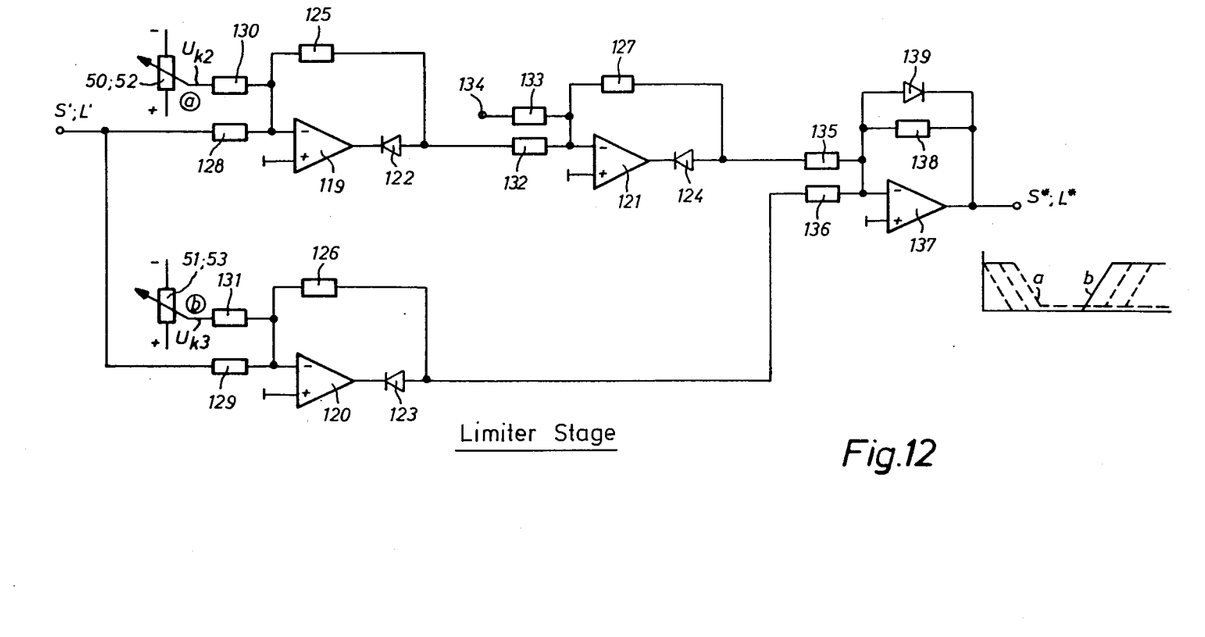
FIG. 12 is an illustrative embodiment of a limiter stage.

The luminance signal generator 45 is followed by a limiter stage 48 in which the luminance control signal L* is formed from the luminance signal L'. The color saturation signal generator 46 is likewise followed by a corresponding limiter stage 49 which converts the color saturation signal S' into the color saturation control signal S*. The formation of the luminance control signal L* and of the color saturation control signal S* occurs by limiting the luminance signal L' or the color saturation signal S' with the assistance of compensating voltages which can be set at potentiometers 50 and 51 or 52 and 53. At the same time, the luminance signal L' and the color saturation signal S' can also be modified in terms of amplitude in the limiter stages 48 or 49 and/or can be modified non-linearly according to gradation curves. FIG. 12 shows an illustrative embodiment of the identically constructed limiter stages 48 and 49.

The luminance control signal L* on the line 19 and/or the color saturation control signal S* on the line 18 are forwarded via the switches 42 and 43 to the logic stage 21 in which the color recognition signal E" on the line 6 is generated according to equation (8).

$$E'=H-T^*-L^*-S^*$$

or $$E''=E'-L^*-S^* \qquad (8)$$

Alternatively, the combination of the hue recognition signal E' with the luminance control signal L* and/or the color saturation control signal S* can also occur in multiplicative fashion.

The luminance values and color saturation values at which the luminance or the color saturation of the scanned colors influence the curve of the color recognition signal E" can also be defined in the demarcation or definition of the color recognition regions with the assistance of the potentiometers 50-53 at the limiter stages 48 and 49. A selection of the signals which are to participate in the formation of the color recognition signal E" can also be undertaken by an operator, depending upon the job, with the assistance of the switches 42 and 43.

The curve of the color recognition signal E" with respect to the hue of the scanned colors corresponds to the curve of the hue recognition signal E' shown in FIG. 4 when luminance and color saturation are left out of consideration.

Figure 6:
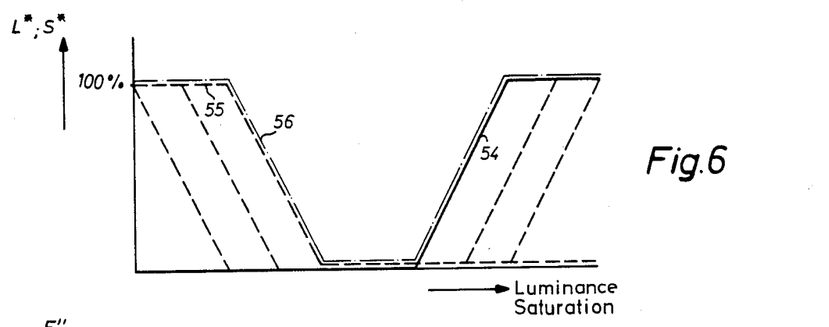
FIG. 6 is another graphic presentation of signal curves.

FIG. 6 shows various curves of the luminance control signal L* dependent on the luminance or on the color saturation control signal S* dependent on the color saturation that can be set by means of the potentiometers 50 through 53 at the limiter stages 48 and 49.

Figure 7:
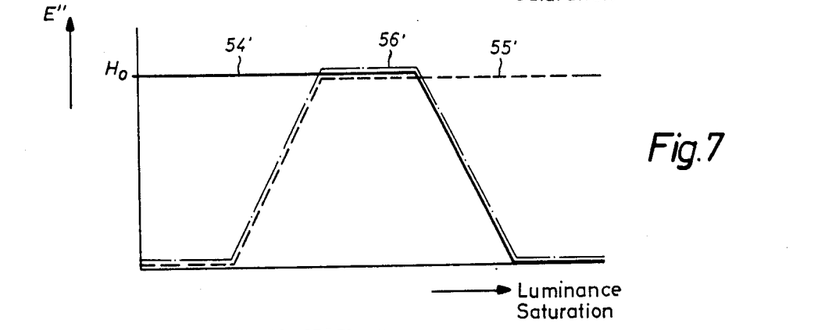
FIG. 7 is a further graphic presentation of signal curves.

FIG. 7 shows the corresponding curves of the color recognition signal E" dependent on the luminance or the color saturation. It is assumed for simplifying the illustration that the hue of a scanned color precisely corresponds to the selected separation color $T_0$.

When it is essentially dark colors that are to be separated, the curve 54, for example, of the luminance control signal L*, is set with the assistance of one of the potentiometers at the limiter stage 48, the curve 54' of the color recognition signal E" thus resulting. In this case, the color recognition signal E" has a high signal level given dark colors and the signal limitation only begins at lighter separation colors.

When on the other hand it is essentially lighter separation colors that are to be recognized, then the curve 55, for example, is set with the assistance of the other potentiometer at the limiter stage 48 and the curve 55' of the color recognition signal E" results. In this case, the color recognition signal E" has a high signal level given light separation colors which is limited toward dark separation colors. Dark and light separation colors can thus be exactly separated from one another in an advantageous fashion.

The curve 56 of the luminance control signal L* and the curve 56' of the color recognition signal E" can also be generated with the assistance of both potentiometers at the limiter stage 48 for the demarcation or definition of a luminance region. Colors that lie in or near the chrominance plane can thus be essentially separated.

A demarcation or definition of the scanned colors with respect to lower or higher color saturation values as well as with respect to a color saturation region can be undertaken by means of an analogous setting of the potentiometers at the limiter stage 49.

In an advantageous development, a black control signal K* is generated from the color saturation signal S' by means of a signal limitation in a further limiter stage 57, and by means of amplitude setting at a potentiometer 58, said black control signal K* being optionally involved in the signal combination in the logic stage 21 by means of an operator actuated switch 59.

The single color separation signal A arises by mixing the selected color signal F with a standardized voltage value W corresponding to the picture white (brightest white) in the mixer circuit 12, whereby the mixing ratio is dependent in accordance with equation (9) on the recognition signal E on the line 6 which, as explained above, is acquired in the recognition circuit 5.

$$A = F \cdot E + (W - E) \quad (9)$$

The standardized voltage value W, for example $W = 1$, is the standardized white level to which all three measured color value signals R, G, and B are matched when measuring the brightest, neutral picture location (white spot) on the color original 1 given the white level calibration of the color scanner.

According to the curves shown in FIG. 4, the recognition signal has a standardized maximum value, for example $E_m = 1$, when scanning the separation hue $T_0$ in the color original 1, and then decreases with the distance of the hues of the scanned colors from the separation hue $T_0$ and is equal to zero ($E = 0$) given hues lying outside of the defined hue recognition region.

Consequently, the single color separation signal A according to equation (9) is equal to the selected color signal F when scanning the separation hue $T_0$, and is an additive mixed signal formed of the selected color signal F and the standardized voltage value W given hues lying within the defined hue recognition region. Accordingly, the mixing ratio is dependent on the distance of the hues of the scanned colors from the separation hue $T_0$, and is equal to the standardized voltage value W, given hues lying outside of the hue recognition region.

For generating the single color separation signal A, the selected color signal F is supplied in the mixer stage 12 to a modulator 60. The modulator 60, which also receives the recognition signal E on the line 6, is designed as a multiplier for color signal F and recognition signal E. The product F·E is forwarded to an adder stage 61 in which a voltage value W' dependent on the recognition signal E is added to the product F·E. For the formation of the voltage value $W' = (W - E)$, the standardized voltage value W corresponding to the picture white or the white level is set at a potentiometer 62. The standardized voltage value W and the recognition signal E inverted in an inverter 63 is added in a further adder stage 64 in order to obtain the voltage value W'.

A desaturation of the colors or hues lying outside of the established recognition regions is advantageously achieved in the described manner of forming the single color separation signal A. At the same time, the color progression or the color transition at region boundaries of the color separation is improved such that the region boundaries are no longer recorded in sharp fashion, but rather are overlapping. A zone of mixed printing arises in the printing occurring later due to the overlap, and the blended colors no longer are printed next to one another, but rather on top of one another in the zone. Accordingly, disturbing color contours are avoided.

The production of color separations for single color printing is significantly improved by the individual setting of the curve of the recognition signal E dependent on color saturation and luminance on the one hand and, on the other hand, by the controlled desaturation. For example, color separations for dark or light colors can be produced whereby the light or dark colors are desaturated or corrected to white. On the other hand, color separations for colors having low or high color saturation can be produced, whereby the highly saturated or unsaturated colors are corrected to white.

FIG. 8 shows an illustrative embodiment of the opto-electronic scanning element 3. The scan light 65 reflected or transmitted by the color original 1 proceeds through lenses 66 and 67 and through a diaphragm 68 into the scanning element 3 and is split there into three sub-beams 65', 65" and 65'" by two dichroitic color splitters 69 and 70. The sub-beams 65', 65", 5'" are incident through corrective color filters 71, 71', and 71" onto opto-electronic transducers 72, 72', and 72" which convert the received sub-light into the primary measured color value signals R, G, and B in accordance with the intensities of the primary color components at the scanned colors.

FIG. 9 shows an illustrative embodiment of the transformation stage 23.

In the transformation stage 23, the chrominance signal $x_0$ and $y_0$ of the selected separation hue $T_0$ are rotated such that, during a balancing operation by constant modification of the angle $\alpha$, the rotated chrominance signals are $x'_0 > 0$ and $y'_0 = 0$. The angle $\alpha_0$ thus found is retained. The coordinate rotation occurs according to equation (4).

The continuously generated chrominance signals x and y are then rotated according to equation (5) during the point-by-point and line-by-line scanning of the color original 1.

The transformation stage 23 is composed of four multiplier stages 74, 75, 76, and 77, of an adder stage 78, of a subtractor stage 79, of a read-only memory 80, of an address counter 81, of a gate stage 82, of a clock generator 83, and of a monitoring stage 84.

The multiplier stages 74, 75, 76, and 77 are advantageously constructed of multiplying digital-to-analog converters, for example of integrated modules of the type AD 7542 of Analog Devices. A selectable factor can be input into such a multiplying digital-to-analog converter via a data input in the form of digital values which are storable in an internal register. An analog signal present at the input of the multiplying digital-to-analog converter is multiplied by the established factor, whereby the product is again available as an analog signal at the output of the multiplying digital-to-analog converter.

During the balancing operation, the chrominance signal $x_0$ coming from the transformer stage 22 indicated with broken lines is forwarded to the inputs 85 and 86 of the multiplier stages 74 and 75, whereas the chrominance signal $y_0$ proceeds to the inputs 87 and 88 of the multiplier stages 76 and 77. The corresponding sine and cosine values for angular values $\alpha$ from 0—360° are stored in the read-only memory 80 as digital values $b = e = \cos \alpha$ and $c = d = \sin \alpha$. They are stored there and are callable by the corresponding angular values which serve as addresses of the read-only memory 80. The data output 89 of the read-only memory 80 for the digital values $b = e = \cos \alpha$ is connected via a data bus 90 to the data inputs 91 and 92 of the multiplier stages 74 and 77, and the corresponding data output 93 for the digital values $c = d = \sin \alpha$ is connected via a data bus 94 to the data inputs 95 and 96 of the multiplier stages 75 and 76.

The switchable clock generator 83 is connected via the gate stage 82 to the clock input 97 of the address counter 81. The output 98 of the address counter 81 is connected via an address bus 99 to the address input 100 of the read-only memory 80. The outputs 101 and 102 of the multiplier stages 74 and 76 are in communication with the adder stage 78, and the outputs 103 and 104 of the multiplier stages 75 and 77 are in communication with the subtractor stage 79.

The output of the adder stage 78 and the output of the subtractor stage 79 are connected to the monitoring stage 84 for
the conditions $x'_0 > 0$ and $y'_0 = 0$. The monitoring stage 84 is in communication with a control input 105 of the gate stage 82.

The balancing operation is initiated by means of switching on the clock generator 83 with the assistance of a key 106. The counting clock is counted into the previously reset address counter 81, whereby the incrementing counter reading corresponds to momentarily rising angular values $\alpha$. The address counter 81 successively calls in the addresses of the read-only memory 80. The digital values $\cos \alpha$ and $\sin \alpha$ belonging to the angular values are transferred into the multiplier stages 74, 75, 76, and 77 and are multiplied there by the corresponding chrominance signals $x_0$ and $y_0$. The individual products are added to or subtracted from one another according to equation (4), so that the rotated chrominance signal $x'_0$ appears at the output of the adder stage 78 and the rotated chrominance signal $y'_0$ appears at the output of the subtractor stage 79. The rotated chrominance signals $y'_0$ and $x'_0$ are thus continuously checked by the monitoring stage 84. The monitoring stage 84 outputs a control signal to the gate stage 82 when the conditions are met, the counting clock being thus interrupted. The counter reading thus reached and fixed in the address counter 81 corresponds to the desired angle $\alpha_0$.

FIG. 10a shows an illustrative embodiment of the signal generator 44 for generating the auxiliary control signal H dependent on the signal x'.

The signal generator 44 is composed of an inverting amplifier 107 whose output is connected to the inverting input of the amplifier 107 via a diode 108 and via a network 109. The inverting input of the amplifier 107 is also charged with the signal x' via a first summing resistor 110 and is connected via a second summing register 111 to a potentiometer 112. A compensating voltage $U_{k1}$ which corresponds to the desired boundary color saturation value $x'_g$ can be set at the potentiometer 112. The non-inverting input of the amplifier 107 is applied to a grounded potential via a resistor 113 and the anode of the diode 108 is applied to a grounded potential via a resistor 114. The auxiliary control signal is H=0 given values of the signal x' which are smaller in value than the compensating voltage $U_{k1}$. When the signal x' reaches the compensating voltage $U_{k1}$ in terms of value, the auxiliary control signal H rises in accordance with the gain set in the network 109 and then reaches a limit value $H_0$, which is likewise prescribed by the network 109.

Figure 10B:
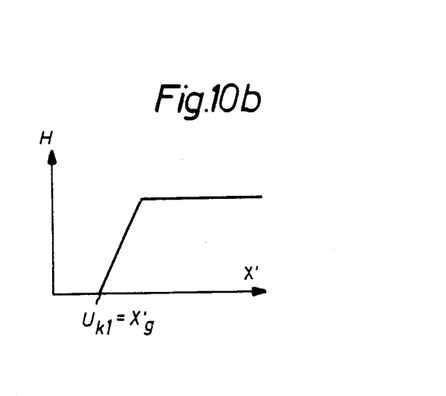
FIG. 10b is a graphic presentation of an output of the signal generator.

FIG. 10b shows the curve of the auxiliary control signal H at the output of the signal generator 44.

Figure 11:
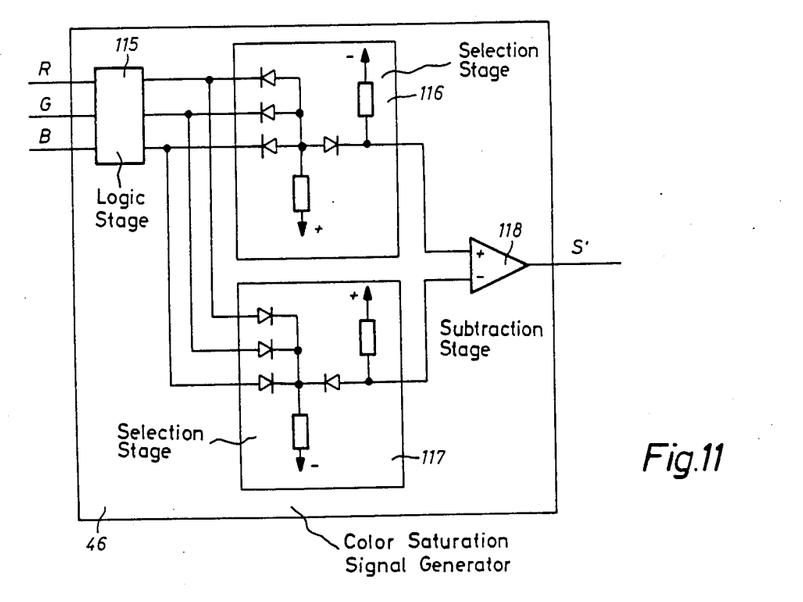
FIG. 11 is an illustrative embodiment of a color saturation signal generator.

FIG. 11 shows an illustrative embodiment of the color saturation signal generator 46 for generating the color saturation signal S' from the measured color value signals R, G, and B.

The measured color value signals R, G, and B supplied from the opto-electronic scanning element 3 (not shown) are logarithmized or partially logarithmized in a logarithmizing stage 115, are simultaneously supplied to a maximum selection stage 116, and to a minimum selection stage 117 which identify the maximum and minimum measured color values from the measured color value signals R, G, and B. Formed in a subtraction stage 118 connected following the maximum selection stage 116 and the minimum selection stage 117 is the color saturation signal S'. It is formed therein as a differential signal from the identified maximum and minimum measured color values and approximately corresponds to the color saturation.

FIG. 12 shows an illustrative embodiment of the limiter stage 48 or 49 and 54 which are identically constructed.

The limiter stage is composed of three inverting amplifiers 119, 120, and 121. The outputs of the amplifiers 119, 120, and 121 are respectively connected via diodes 122, 123, and 124, and via resistors 125, 126, and 127 to the inverting inputs of the amplifiers. The inverting inputs of the amplifiers 119 and 120 are provided in common with the input signal via first summing resistors 128 and 129. The inverting input of the amplifier 119 is connected via a summing resistor 130 to the potentiometer 50 or 52, and the inverting input of the amplifier 120 is connected via a further summing resistor 131 to the potentiometer 51 or 53. The inverting input of the amplifier 121 is connected to the output of the amplifier 119 via a summing resistor 132 and is connected to a positive voltage source 134 via a summing resistor 133. The outputs of the amplifiers 120 and 121 communicate via summing resistors 135 and 136 with the inverting input of a limiter amplifier 137 whose output is coupled to the inverting input via a parallel connection of a resistor 138 with a limiting diode 139. The limited signals having the curves illustrated in FIG. 6 are available at the output of the limiter amplifier 137.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for production of color separations of a color original for single color printing, comprising the steps of:
   (a) trichromatically scanning the color original point-by-point and line-by-line by an optoelectronic scanning element for obtaining measured color value signals R, G, B;
   (b) generating corrected color signals $F_1$, $F_2$, $F_3$ from the measured color value signals R, G, B;
   (c) determining a color locus $F_0$ of a selected separation hue $T_0$ of a color of the original by color values $R_0$, $G_0$, $B_0$;
   (d) transforming the color locus $F_0$ of the selected separation hue $T_0$ into a chrominance plane of a chrominance/luminance color space by a first transformation of said color values $R_0$, $G_0$, $B_0$ corresponding chrominance values $x'_0$, $y'_0$ such that a transformed color locus $F'_0$ lies on one of the axes of a rotated X'Y' color coordinate system in said chrominance plane of the color space, and retaining transformation coefficients required therefor;
   (e) continuously transforming color loci of hues of the scanned colors of the original into the chrominance plane by a second transformation of the measured color value signals R, G, B into chrominance values x', y' with the previously identified transformation coefficients;
   (f) selecting those chrominance values x', y' whose corresponding transformed color loci F' lie in a same half of the X'Y' rotated color coordinate system as the transformed color locus $F'_0$ of the selected separation hue $T_0$;
   (g) acquiring a hue signal T' by forming a quotient of absolute values of the selected chrominance values x', y', this respectively corresponding to a tangent of an angle $\beta$ described by the corresponding axis and a connecting line between coordinate origin and a transformed color locus F' of the hue of a scanned color of the original, the hue signal T' being a measure for a respective value-wise hue deviation of the hue of the scanned color of the original from the selected separation hue $T_0$;
   (h) acquiring a hue recognition signal E' from auxiliary control signal H and the hue signal T', said hue recognition signal E' having its highest value when scanning the selected separation hue $T_0$ and having a value of zero when scanning a hue having a prescribed maximum hue deviation from the selected separation hue $T_0$, a sector-shaped hue recognition region being defined around the corresponding axis and around the selected separation hue $T_0$;
   (i) emitting the hue recognition signal E' when the measured color value signals R, G, B fall within the hue recognition region;
   (j) selecting at least one of said corrected color signals $F_1$, $F_2$, $F_3$ as a selected color signal F;
   (k) combining said hue recognition signal E' for the selected separation hue $T_0$ with said selected color signal F to form a separation signal A; and
   (l) recording a color separation point-by-point and line-by-line on a recording medium by a recording element controlled by said separation signal A.

2. A method according to claim 1 wherein the combination of the selected color signal F and the hue recognition signal E' to form the separation signal A occurs by mixing the selected color signal F with a standardized voltage value W in a mixing ratio dependent on a distance of a hue scanned in the color original from the selected separation hue $T_0$, the recording signal A being equal to the selected color signal F when scanning the selected separation hue $T_0$, and being equal to the standardized voltage value W when scanning a hue lying outside of the hue recognition region.

3. A method according to claim 2 wherein the standardized voltage value W corresponds to a white level to which the measured color value signals R, G, B, acquired when measuring a brightest neutral picture location of the color original, are compensated.

4. A method according to claim 1 wherein the selection step of said corrected color signals $F_1$, $F_2$, $F_3$ is further defined by selecting a corrected color signal which best reproduces a color progression of the selected separation hue $T_0$ in the color separation.

5. A method according to claim 1 wherein the selected color signals F correspond to color separation values Y, M, C for polychromatic mixed printing acquired by means of a color correction.

6. A method according to claim 1 including the step of defining the color values $R_0$, $G_0$, $B_0$ of the selected separation hue $T_0$ by an optoelectronic measurement of a corresponding hue in the color original.

7. A method according to claim 1 including the step of setting a prescribed maximum hue deviation from the selected separation hue $T_0$ by amplitude modification of chrominance values perpendicular to the corresponding axis.

8. A method according to claim 1 including the step of setting a prescribed maximum hue deviation from the selected separation hue $T_0$ by amplitude modification of the hue signal T'.

9. A method according to claim 1 including the step of setting a prescribed maximum hue deviation from the selected separation hue $T_0$ by amplitude modification of the auxiliary control signal H.

10. A method according to claim 1 including the step of setting an aperture angle of the hue recognition region by amplitude modification of the chrominance values y' perpendicular to the corresponding axis.

11. A method according to claim 1 including the step of setting an aperture angle of the hue recognition region by amplitude modification of the hue signal T'.

12. A method according to claim 1 including the step of setting an aperture angle of the hue recognition region by amplitude modification of the auxiliary control signal H.

13. A method according to claim 1 including the step of acquiring the hue recognition signal E' by difference formation between the auxiliary control signal H and the hue signal T'.

14. A method according to claim 1 wherein the first transformation of the color values $R_0$, $G_0$, $B_0$ of the selected separation hue $T_0$ into the chrominance values $x'_0$, $y'_0$ occurs by the steps of
 (a) matrixing the measured color values $R_0$, $G_0$, $B_0$ into the chrominance values $x_0$, $y_0$ of an XY color coordinate system in the chrominance plane corresponding to a transformation of the RGB color space into the chrominance/luminance color space according to the equations:

$$x_0 = a_{11}R_0 + a_{12}G_0 + a_{13}B_0$$

$$y_0 = a_{21}R_0 + a_{22}G_0 + a_{23}B_0$$

and
 (b) performing a coordinate rotation of the chrominance values $x_0$, $y_0$ of the XY color coordinate system into the chrominance values $x'_0$, $y'_0$ of an X'Y' color coordinate system rotated by an angle $\alpha_0$ relative to the XY color coordinate system, said coordinate rotation being dependent upon a position of the color locus $F_0$ of the selected separation hue $T_0$ to be selectively corrected within the chrominance plane and corresponding to a rotation of the chrominance/luminance color space around the luminance axis (Z) according to the equations $$x'_0 = x_0 \cos \alpha_0 + y_0 \sin \alpha_0$$

$$y'_0 = -x_0 \sin \alpha_0 + y_0 \cos \alpha_0$$

whereby the angle $\alpha_0$ as a transformation coefficient is defined such that the transformed color locus $F'_0$ of the selected separation hue $T_0$ lies on one of the axes of the X'Y' color coordinate system.

15. A method according to claim 14 including the step of modifying the angle $\alpha$ by an automatic balancing operation until one of the chrominance value $x'_0$ or $y'_0$ in the X'Y' color coordinate system becomes zero, and retaining the angle $\alpha_0$ thus found as a transformation coefficient.

16. A method according to claim 1 wherein the second transformation of the measured color values R, G, B, of the hues of the scanned colors of the original into the chrominance values x', y' of the transformed color loci F' occurs by the steps of
 (a) matrixing the measured color values R, G, B into the chrominance values x, y of the XY color coordinate system in the chrominance plane corresponding to a transformation of the RGB color coordinate space into the chrominance/luminance color space according to the equations $$x = a_{11}R + a_{12}G + a_{13}B$$

$$y = a_{21}R + a_{22}G + a_{23}B$$

and
 (b) performing a coordinate rotation of the chrominance values x, y of the XY color coordinate system into the chrominance values x', y' of the X'Y' color coordinate systems around the identified angle $\alpha_0$ according to the equations $$x' = x \cos \alpha_0 + y \sin \alpha_0$$

$$y' = -x \sin \alpha_0 + y \cos \alpha_0.$$

17. A method according to claim 1 including the step of deforming the hue signal T' before its combination with the auxiliary control signal H.

18. A method according to claim 1 including the steps of
 (a) generating a color saturation signal S' from the measured color value signals R, G, B, and generating a luminance signal L' from at least one of the measured color value signals R, G, B;
 (b) limiting the color saturation signal S' and luminance signal L' in amplitude dependent on prescribed color saturation values and luminance values in order to obtain a color saturation control signal S* and a luminance control signal L*; and
 (c) combining at least one of the control signals with the hue signal T' and the auxiliary control signal H in order to additionally control the hue recognition signal E' dependent on at least one of the parameters color saturation and brightness.

19. A method according to claim 18 wherein for generating the color saturation signal S', performing the steps of
 (a) selecting respective maximum and minimum measured color values from the measured color values R, G, B; and
 (b) forming the color saturation signal S' from the difference of maximum and minimum measured color values.

20. A method according to claim 1 wherein for the definition of separation colors,
 (a) combining the auxiliary control signal H with a hue control signal T*, a color saturation control signal S*, and a luminance control signal L* to form a color recognition signal E''; and
 (b) setting an amplitude limitation of at least one of the control signals S* and L* such that the color recognition signal E'' differs from zero only within a three-dimensional color recognition region for the corresponding separation color.

21. A method according to claim 20 including the step of forming a resulting sum signal of the hue control signal T*, color saturation control signal S*, and luminance control signal L*, and subtracting said resulting sum signal from the auxiliary control signal H in order to obtain the color recognition signal E''.

22. A method according to claim 1 wherein the auxiliary control signal H is dependent on color saturation values of a scanned color in the color original.

23. A method according to claim 22 wherein the auxiliary control signal H is zero from the color saturation signal value zero up to a boundary color saturation value $x_g$ which defines an expanse of a gray region around a luminance axis Z of the chrominance/luminance color space and has a constant value $H_0$ from the boundary color saturation value $x_g$ up to the maximum color saturation values.

24. An apparatus for production of color separations from a color original for single color printing, comprising:
(a) an optoelectronic scanning means for the color original for acquisition of measured color value signals R, G, B;
(b) a recognition circuit means connected to the scanning means for definition of a recognition region and for generating a recognition signal;
(c) a correction circuit means connected to the scanning means for acquisition of corrected color signals $F_1$, $F_2$, $F_3$ from the measured color value signals R, G, B;
(d) selector means connected to said correction circuit means for selecting at least one of said corrected color signals $F_1$, $F_2$, $F_3$ as a selected color signal F;
(e) a mixer circuit means for formation of a recording signal A and which is connected to the selector means and the recognition circuit means;
(f) a recording element means connected to the mixer circuit means for point-by-point and line-by-line recording of the color separation;
(g) the recognition circuit means comprising:
(i) a transformation circuit means connected to the optoelectronic scanning means for transforming the measured color values R, G, B into chrominance values $x'$, $y'$ of an X'Y' color coordinate system in a chrominance plane of a chrominance/luminance color space;
(ii) a selection and value circuit means connected to the transformation circuit means for selection of chrominance values and for providing absolute values;
(iii) setting means for definition of a hue recognition region, the setting means being connected to the selection and value circuit means;
(iv) a divider means in communication with the setting means and the selection and value circuit means for formation of a hue signal T' from the absolute values of the selected chrominance values;
(v) a signal generator means for generating an auxiliary control signal H;
(vi) logic stage means connected to the divider means and to the signal generator means for acquisition of a hue recognition signal E' from the auxiliary control signal H and the hue signal T'; and
(vii) the logic stage means comprising a mixer stage.

25. An apparatus according to claim 24 wherein the logic stage means comprises a differential stage.

26. An apparatus according to claim 24 wherein a signal shaping means for the hue signal T' is positioned between the divider means and the logic stage means.

27. An apparatus according to claim 24 wherein the recognition circuit means additionally comprises for definition of separation colors:
(a) a color saturation signal generator means and a luminance signal generator means connected to the optoelectronic scanning means for acquisition of a color saturation signal S' and of a luminance signal L' from the measured color value signals R, G, B;
(b) variable limiter stage means connected following the signal generator means for generating a color saturation control signal S* and a luminance control signal L* by amplitude limitation; and
(c) manual switch means connected to the limiter stage means and the logic means for selective combination of at least one of the signals color saturation signal S* and luminance control signal L* with the hue signal T' and the auxiliary control signal H in order to generate a color recognition signal E''.

28. An apparatus according to claim 27 wherein the mixer circuit means comprises:
(a) multiplier means for formation of a product of the selected color signal F and the color recognition signal E'';
(b) voltage source means for setting a standardized voltage value W;
(c) subtractor means for formation of a difference of the standardized voltage value W and the color recognition signal E''; and
(d) adder means for formation of the recording signal A and which is connected to the multiplier means and to the subtractor means.

29. An apparatus according to claim 24 wherein the mixer circuit means comprises:
(a) multiplier means for formation of a product of the selected color signal F and the hue recognition signal E';
(b) voltage source means for setting a standardized voltage value W;
(c) subtractor means for formation of a difference of the standardized voltage value W and the hue recognition signal E'; and
(d) adder means for formation of the recording signal A and which is connected to the multiplier means and to the subtractor means.

30. An apparatus for production of color separations of a color original for single color printing, comprising:
(a) means for trichromatically scanning the color original point-by-point and line-by-line with an optoelectronic scanning element for acquisition of measured color value signals R, G, B;
(b) means for generating corrected color signals $F_1$, $F_2$, $F_3$ from the measured color value signals R, G, B and for selecting at least one of said corrected color signals $F_1$, $F_2$, $F_3$ as a selected color signal F;
(c) means for detecting a color locus $F_0$ of a selected separation hue $T_0$ of a color of the original by color values $R_0$, $G_0$, $B_0$;
(d) means for transforming the color locus $F_0$ of the selected separation hue $T_0$ into the chrominance plane of a chrominance/luminance color space by a first transformation of said color values $R_0$, $G_0$, $B_0$ into corresponding chrominance values $x'_0$, $y'_0$ such that a transformed color locus $F'_0$ lies on one of the axes of a rotated X'Y' color coordinate system in said chrominance plane of the color space, and retaining a transformation coefficient required therefor;
(e) means for continuously transforming color loci of hues of the scanned colors of the original into the chrominance plane by a second transformation of the measured color value signals R, G, B into chrominance values $x'$, $y'$ with the previously identified transformation coefficient;
(f) means for selecting those chrominance values $x'$, $y'$ whose corresponding transformed color loci F' lie in a same half of the X'Y' rotated color coordinate system as the transformed color locus $F'_0$ of the selected separation hue $T_0$;

(g) means for acquiring a hue signal T' by forming a quotient of the absolute values of the selected chrominance values x', y', this respectively corresponding to a tangent of an angle $\beta$ which is described by the corresponding axis and a connecting line between coordinate origin and a transformed color locus F' of the hue of a scanned color of the original, whereby the hue signal T' is a measure for the respective value-wise hue deviation of the hue of the scanned color of the original from the selected separation hue $T_0$;

(h) means for acquiring a hue recognition signal E' from an auxiliary control signal H and the hue signal T', said hue recognition signal E' having its highest value when scanning the separation hue and having a value of zero when scanning a hue having a prescribed, maximum hue deviation from the selected separation hue $T_0$, a sector-shaped hue recognition region being defined around the corresponding axis and around the separation hue $T_0$;

(i) means for emitting the hue recognition signal E' when the measured color value signals R, G, B fall within the recognition region; and (j) means for recording a color separation point-by-point and line-by-line on a recording medium by a recording element controlled by a separation signal A by combining the hue recognition signal E' for the selected separation hue $T_0$ with the selected color signal F to form the separation signal A for recording of the color separation.

31. A method for production of color separations from a color original for single color printing, comprising the steps of:

(a) acquiring measured color value signals R, G, B by scanning the original;

(b) acquiring corrected color signals $F_1$, $F_2$, $F_3$ from the measured color value signals R, G, B and selecting at least one of said corrected color signals $F_1$, $F_2$, $F_3$ as a selected color signal F;

(c) transforming the measured color values R, G, B into chrominance values x', y' of an X'Y' color coordinate system in the chrominance plane of a chrominance/luminance color space;

(d) selecting chrominance values and providing formed values;

(e) defining a hue recognition region;

(f) forming a hue signal T' from the formed values of the selected chrominance values;

(g) generating an auxiliary control signal H;

(h) acquiring a hue recognition signal E' from the auxiliary control signal H and the hue signal T'; and (i) forming a recording signal A from the hue recognition signal E' and the selected color signal F and recording point-by-point and line-by-line the color separations.

* * * * *